Oct. 11, 1960    A. G. SMITH    2,955,873
END GATE FOR WAGONS
Filed Jan. 17, 1958
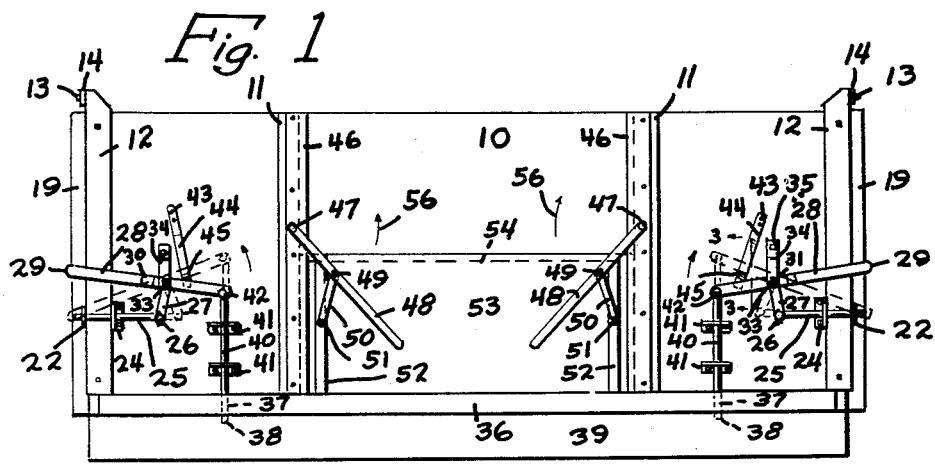
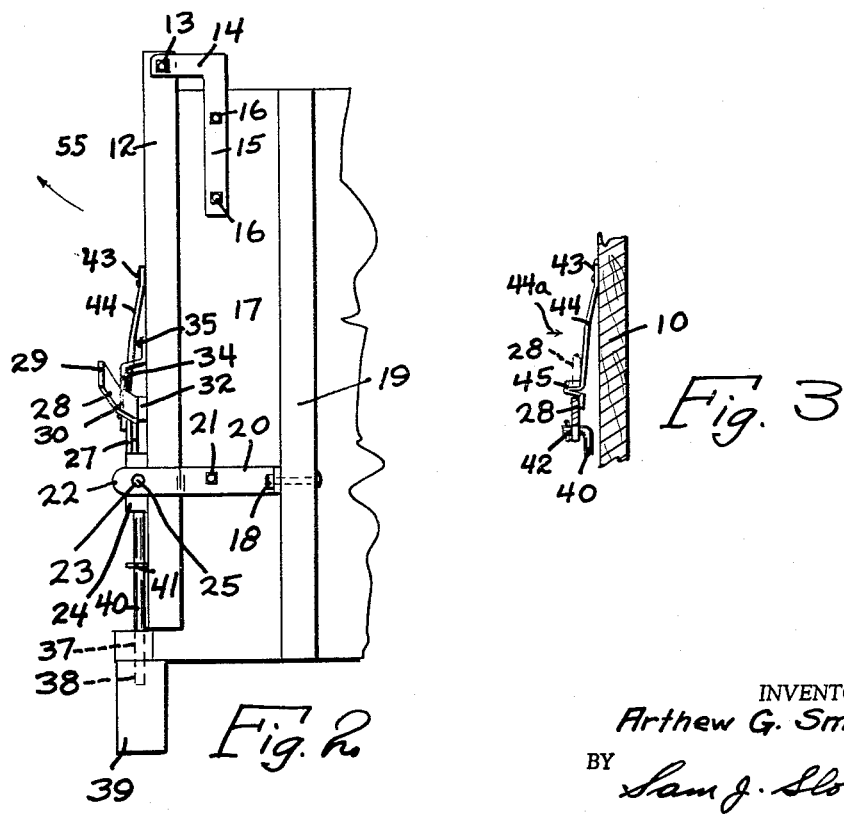
INVENTOR.
Arthew G. Smith
BY
Sam J. Slotsky
ATTORNEY

United States Patent Office 2,955,873
Patented Oct. 11, 1960

2,955,873

END GATE FOR WAGONS

Arthew G. Smith, 709 3rd Ave. E., Spencer, Iowa

Filed Jan. 17, 1958, Ser. No. 709,646

1 Claim. (Cl. 296—56)

My invention relates to an end gate for wagons.

An object of my invention is to provide an end gate for wagons wherein the end gate can be released for opening by merely moving a single bar at each side of the end gate, and whereby the locking bolts commonly used will be eliminated so that it will not be necessary to unscrew the nuts and washers on these locking bolts.

A further object of my invention is to provide means whereby a vertically positioned locking bar as well as a horizontally positioned locking bar will be automatically retracted at the same time to provide such release.

A further object of my invention is to provide means for retaining the mechanism in open position so that it will not fall out of place.

A further object of my invention is to provide a grain gate arrangement in association with my end gate which can be easily opened or closed.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1 is a rear view of a wagon to which my end gate and end gate mechanism are attached, Figure 2 is an enlarged side view of Figure 1, and Figure 3 is an enlarged sectional detail taken along the lines 3—3 of Figure 1.

My invention contemplates the provision of a simple mechanism attachable to end gates which will automatically allow opening of the end gate, or will lock the same in closed position by the use of simple, automatic arrangements.

I have used the character 10 to designate generally the end gate itself, which can include a pair of vertical strips 11, and attached to the end gate are a pair of end angle members 12 which are pivoted by means of the bolts 13 to the bracket portions 14 of the vertically positioned members 15 (see Figure 2) which are suitably bolted at 16 to the sides 17 of the wagon.

Bolted at 18 to the vertical portions 19 of the wagon are the brackets 20 which are also bolted at 21, the brackets 20 extending into the outer portions 22 having the openings 23.

Attached to the end gate 10 are the angle members 24 which slidably receive the lengthened round bars 25 which pass therethrough as shown in Figure 1, the ends of the bars 25 also passing through the openings 23 in the positions 22 of the brackets 20.

The bars 25 are bent at the ends and are pivotally attached at 26 to the short arms 27, the arms 27 being securely welded to the elongated handles 28, which handles 28 extend outwardly to their extremities 29, and are suitably bent outwardly at 30 so as to completely clear the angles 12. The handles 28 are also pivoted at 31 to the short posts 32 (see Figure 2) by means of suitable bolts 33, the bolts 33 also passing through the lower ends of the brackets 34 which are secured at 35 to the end gate.

The bottom 36 of the wagon includes the openings 37, and coinciding with the openings 37 are the further lower openings 38 which are provided in the transverse brace 39 of the wagon, and received in these openings 37, 38 are the vertically positioned round rods 40, which pass through suitable openings in the angle members 41, which members 41 are secured to the end gate 10, the rods 40 being bent outwardly at their upper extremities and being pivoted at 42 to the inner ends of the handles 28.

Attached at 43 to the end gate 10 are the resilient spring straps 44 which include the outwardly bent V-shaped portions 45 which portions 45 normally abut against a portion of the upper edges of the handles 28 which the arrangement is in the closed position.

The openings in the various members 22, 41, and 24 are made large enough to allow a slight lateral or sideways movement of the rods 25 and 40 during the opening action.

Attached to the strips 11 are the vertical plates 46 to which are pivoted at 47 the bars 48 to which are pivoted at 49 the links 50, which links 50 are pivoted at 51 to the cleats 52 which are secured to the movable door 53, the side edges of which are received between the plates 46 and the end gate 10, the door 53 being adapted to close the opening 54 which is provided in the end gate 10.

The operation of the device is as follows. When opening the end gate, the ends 29 of the handles 28 are pulled downwardly which will correspondingly pivot the arms 28 at 31, and which will pull the bars 40 upwardly and out of the openings 37 and 38, and at the same time the arms 27 will pull the bars 25 out of the openings 23 in the portions 22; therefore, by merely pulling down the handles 28 at each side, the end gate is completely unlocked and can then be pivoted in the direction of the arrow 55 (see Figure 4). After the end gate is closed, it is re-locked by merely raising the handle ends 29 which will cause engagement of the bars 40 and 25 with the same openings.

It will be noted that the portions 45 serve to lock the handles 28 in open position, this being accomplished by merely pushing the spring 44 inwardly in the direction of the arrow 44a, which will allow the lower ends of the bar 28 to pass beyond the portion 45 and thence become locked against downward movement. This feature will eliminate the bolts from sliding outwardly again when the end gate is raised, and to release, the spring 44 is merely pushed inwardly again.

As a result, it will be noted that by means of a very simple movement which does not require the cumbersome unlocking or unthreading of bolts, nuts and the like, I have provided means for releasing or reclosing the end gate as desired, and which will thereby also require a minimum of time.

For raising the gate portion 53, the bars 48 are pivoted upwardly in the direction of the arrows 56 to the maximum upper position, which will cause the links 50 to raise the door 53, and due to the leverages applied, the raising action is thus rendered easy and convenient, and the arms 48 when swung to the maximum position will retain the door in raised position, or any type of locking arrangement can be employed if desired.

It will now be seen that I have provided the advantages mentioned in the objects of my invention with further advantages being apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

An end gate for wagons having wagon base portions comprising an end gate member pivotally secured to the rear of said wagon at its upper corners, brackets attached to said end gate member, lengthened handles pivoted to said brackets, lengthened vertical bars pivoted to the inner ends of said handles, said wagon base portions including openings receiving the lower ends of said vertical bars whereby downward movement of the outer ends of said handles will raise the ends of said bars out of said openings, further brackets attached to the sides of said wagon, said brackets having further openings, horizontally positioned bars received in said further openings, straps attached to said handles and pivoted thereby, further bars pivotally attached at the lower terminals of said straps and received in said further openings whereby movement of the outer ends of said handles will move said further bars out of said further openings, means for locking said handles in closed and open position including a pair of resilient spring straps attached to said end gate, said spring straps including raised portions against which said handles bear.

References Cited in the file of this patent

UNITED STATES PATENTS

| | | |
|---|---|---|
| 241,484 | Forbes | May 17, 1881 |
| 592,747 | Strout | Oct. 26, 1897 |
| 1,077,433 | Schlis | Nov. 4, 1913 |
| 1,400,483 | Fehr | Dec. 13, 1921 |
| 1,506,092 | Sisko | Aug. 26, 1924 |
| 1,592,742 | Nelson | July 13, 1926 |
| 2,732,252 | Stekelenburg | Jan. 24, 1956 |